July 23, 1968  S. L. BETTINGER  3,393,598
FASTENER NUT, QUICK ACTION
Filed Jan. 10, 1967  3 Sheets-Sheet 1
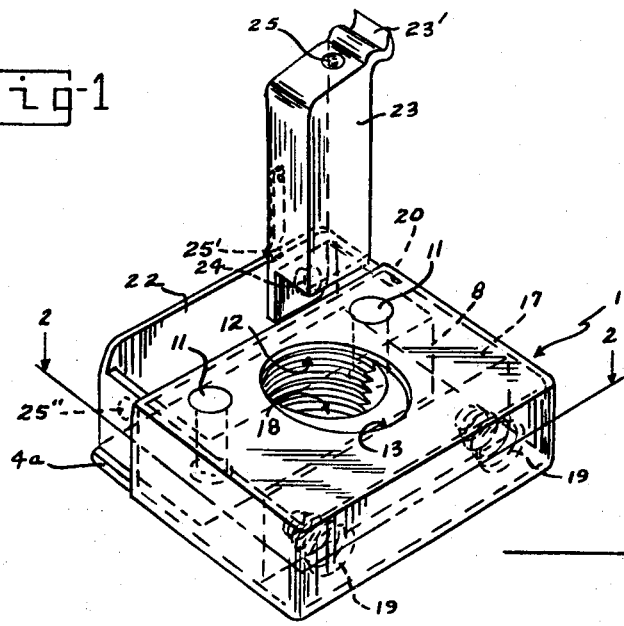
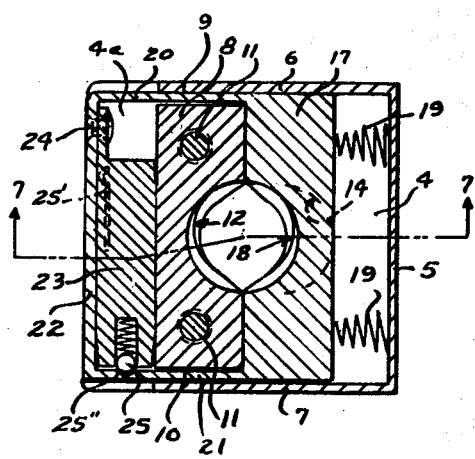
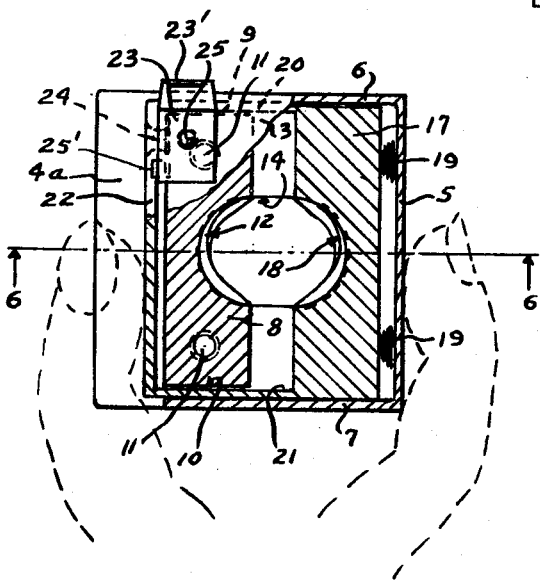
INVENTOR.
STEPHEN L. BETTINGER
BY
Charles H. Wagner
ATTORNEYS

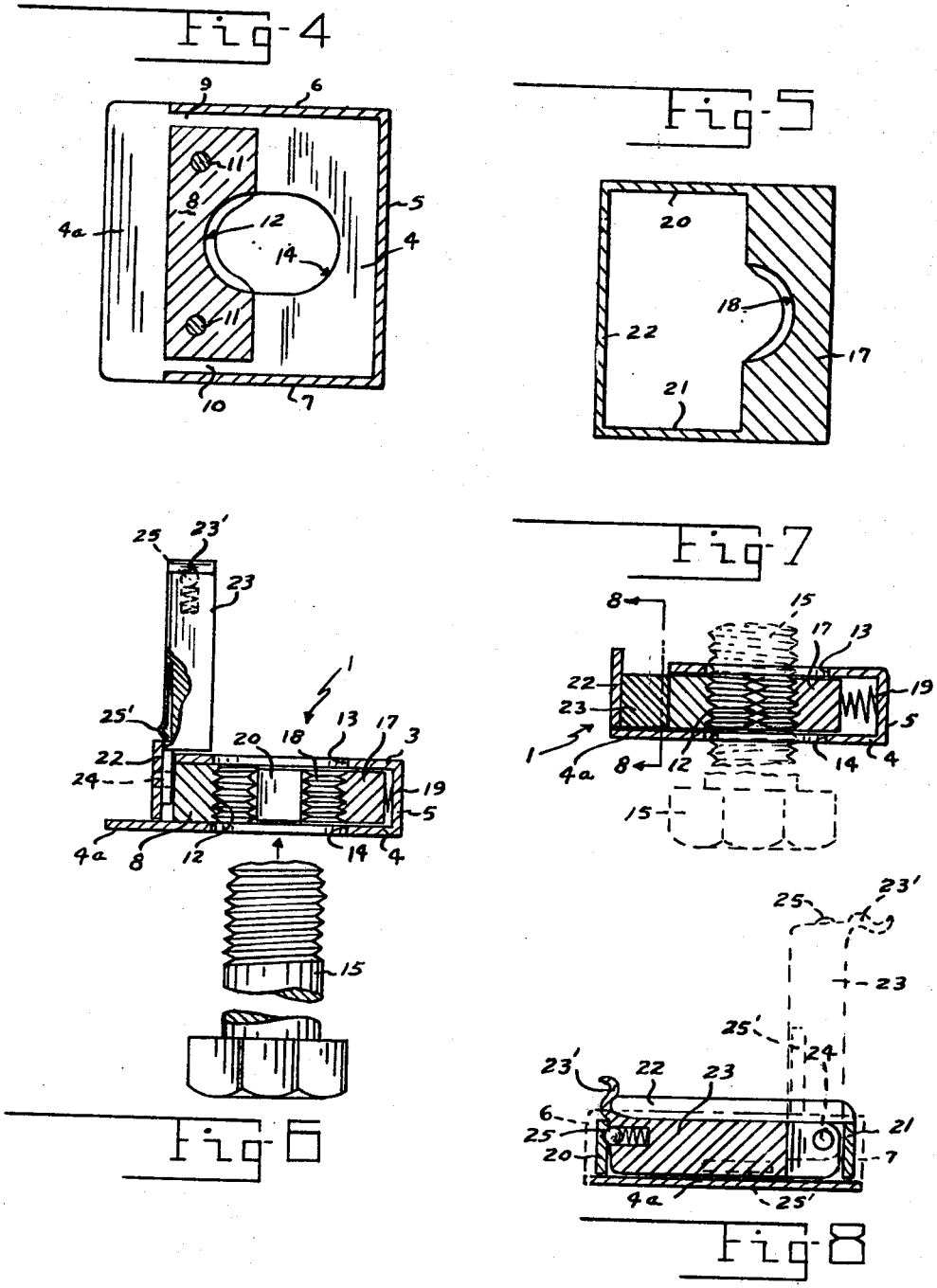

July 23, 1968 S. L. BETTINGER 3,393,598
FASTENER NUT, QUICK ACTION
Filed Jan. 10, 1967 3 Sheets-Sheet 3

INVENTOR.
STEPHEN L. BETTINGER
BY
Charles H. Wayne
ATTORNEYS

United States Patent Office 3,393,598
Patented July 23, 1968

3,393,598
FASTENER NUT, QUICK ACTION
Stephen L. Bettinger, 549 McIntire Drive,
Fairborn, Ohio 45324
Filed Jan. 10, 1967, Ser. No. 608,455
7 Claims. (Cl. 85—33)

ABSTRACT OF THE DISCLOSURE

A nut structure having complemental threaded halves shiftable toward each other by means to surround and engage the threads of a conventional inserted bolt or screw shaft to retain the nut structure on the bolt or screw shaft for tightening, and is readily releasable to permit the halves to be separated, preferably by manual pressure on the opposite side edges of the nut structure to permit nut structure to be placed on, or removed from, the conventional bolt or screw threaded shaft without the screwing or turning thereof. The structure may include resilient means for moving the half nut section into bolt engaging relation and locking means for retaining the nut half-sections in thread-engaging relation.

---

The invention described herein may be manufactured and used by or for the United States Government for governmental purposes without the payment to me of any royalty thereon.

Background of the invention

The invention relates to fastening devices, and more particularly to quick detachable threaded fasteners of the bolt and nut types such as split and separable nut structures employed in connection with conventional threaded bolts or threaded shaft members, having for an object complemental threaded half nut sections which are movable away from each other to receive a conventional bolt or threaded shaft or rod therebetween with resilient means for moving the half nut sections toward each other into threaded engagement with the bolt element, whereby the nut or the bolt may be rotated to tighten as in a conventional bolt and nut structure.

Summary of the invention

The invention comprises a simple and quickly assembled bolt and nut structure using a conventional bolt and split or separable half nut portions which are mounted in a case and includes spring means normally urging the half nut portions together to form a complete nut and is opened to receive or remove the bolt with which it is used by opposing pressure applied to the opposite side edges of the nut structure. The invention contemplates locking means which may be used when the nut sections are brought together to engage the bolt or shaft threads so that the split nut sections cannot be separated, permitting the nut structure to be rotated and "torqued up" in the usual manner, making it possible for quick assembly and disassembly of parts and equipment by the use of the same under abnormal conditions, such as in outer space.

More particularly the fastener includes a rectangular hollow block of metal which is drilled, tapped or threaded, then split transversely so as to present two pieces or blocks with complemental semicircular threaded portions. A case is provided in which one of the half nut portions is fixed while the other half nut section is slidable in the case toward and away from the fixed half nut section and includes spring means between the case and the slidable half nut section urging the same toward or into contact with the fixed half nut section and includes means extending out of the case for moving the slidable section away from the fixed half nut section to separate the two sections to permit insertion of a conventional bolt therebetween for threaded engagement with the threads when the slidable nut section is released. A squeeze action between the opposite side edges of the exterior of nut structure operates to cause the half nut sections to be separated so that the nut structure can be readily slipped over and onto a standard bolt and pushed down tight, after which the nut structure can be rotated and torqued up tight in the usual manner.

The invention contemplates releasable locking means operable between the fixed and slidable complemental half nut sections or blocks which is operable to positively lock the sections together against separation after they have been brought together into threaded engagement with the threads on the bolt or thread shaft on which the nut structure is applied.

An object of the invention is the provision of a separable nut structure comprising two half nut sections each having complemental semicircular threaded openings therein adapted to surround and engage the threads of a standard or conventional threaded shaft or bolt, including spring means normally urging and holding the half nut sections together, and the sections are easily and conveniently separated by manual actuating means to permit a threaded bolt-like fastener to be inserted through the separated semicircular threaded recesses and threadably engaged thereby when the manual actuating means is released.

A further object includes manually operable locking means for locking the two half nut sections together, after they have been moved toward each other into thread-engaging relation.

Brief description of drawings

FIGURE 1 is a perspective view of one form of the nut structure showing the split nut sections or blocks closed to form an annular threaded bolt receiving opening, but showing the locking means in its inoperative position so that the sections can be separated by squeeze pressure on the opposite side edges of the nut structure, for the reception of a conventional bolt or threaded shaft or rod therethrough.

FIGURE 2 is a sectional view taken about on the plane indicated by line 2—2 of FIG. 1, looking in the direction of the arrows, but with the locking block or lever in locking position.

FIGURE 3 is a somewhat similar view, also taken about on line 2—2 of FIG. 1, but with the locking means raised and the split half nut sections separated to receive a bolt therethrough by squeeze pressure on the opposite side edges of the nut structure.

FIGURE 4 is a detail sectional view taken about on the same plane as FIGS. 2 and 3 but showing only the casing and the fixed half nut section therein.

FIGURE 5 is a similar view of the other or slidable half nut or block portion with the locking lever or bar omitted.

FIGURE 6 is a sectional view about on the plane indicated by line 6—6 in FIG. 3 showing the split nut structure opened to receive a bolt such as shown below the figure.

FIGURE 7 is a similar sectional view but taken about on line 7—7 of FIG. 2 and showing the split nut sections closed and in threaded engagement with a bolt, and the locking lever moved into locking position.

FIGURE 8 is a detail sectional view taken about on line 8—8 of FIG. 7 showing the locking block or lever moved to operative or locking position in full lines, and in unlocked or inoperative position in dotted lines.

*Description of the preferred embodiments*

Figure 9:
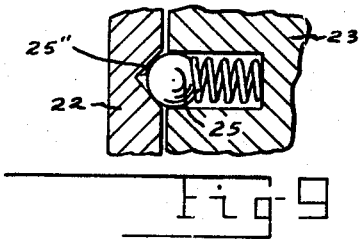
FIGURE 9 is a fragmentary detail sectional view of a conventional holding detent such as may be used to hold the locking lever in its operative (locking) position, and in its inoperative (unlocked) position.

Referring to the drawings the reference numeral 1 denotes my improved nut structure generally which comprises an outer hollow metallic casing 2 preferably comprising substantially rectangular top and bottom plates 3 and 4 and end and side plates 5, 6 and 7.

The bottom plate 4 projects outwardly beyond the side pltaes 6 and 7 and is preferably square in plan as denoted at 4a. The side of the casing 2, which is opposite the side 5, is left open to receive a stationary or half nut section or block 8, as seen in FIG. 4. The block 8 is shorter than the space between the side walls 6 and 7 to provide guide passages 9 and 10 between the ends of the block 8 and the side walls 6 and 7.

This split nut block 8 is fixed in place between the top and bottom plates 3 and 4 by rivets 11 or other means such as by welding.

This stationary or fixed block 8 forms one half of a two piece split nut having a substantially semicircular threaded opening or recess 12 formed therein for receiving the threads of a suitable conventional bolt or threaded shaft therein.

The top and bottom plates 3 and 4 are formed with aligned elongated or eliptical bolt receiving openings 13 and 14, substantially as shown in FIGS. 1 and 4 through which a conventional bolt, such as indicated at 15 in FIG. 6 may be freely inserted.

A slide block 17 forming the other half of the split nut and complemental to the stationary or fixed half nut block 8 is slidably disposed within the casing 1 between the side wall 5 and the stationary half nut block 8 and, of course, between the top and bottom plates 3 and 4.

The slidable block 17 is also formed with a complemental semicircular threaded recess or opening 18 which with the threaded opening 12, when the blocks 8 and 17 are moved together into operative position, form an annular or circular threaded bolt receiving and engaging opening.

Resilient means in the form of spiral (conical) springs 19 are disposed between the rear wall of the half nut slide block 17 and the opposite side plate 5 and normally urge the block 17 toward the fixed half-nut block 8.

The complemental slide block 17 is formed with forwardly extending actuating arms 20 and 21 which are slidably disposed in the guide passages 9 and 10 and between the top and bottom plates 3 and 4, and are connected together at their outer ends by a cross bar or plate 22 which preferably extends upwardly above the level of the top plate 3, and on which a locking lever or bar 23 is pivoted at 24.

The locking lever 23 is provided with suitable detent means 25 and 25' for instance as seen in FIG. 9, for releasably holding the locking bar or lever 23 respectively in its operative closed or locked position as seen in FIGS. 2, 7 and 8, and in unlocked position as shown in FIGS. 1, 3, and 6, and shown dotted in FIG. 8.

As mentioned before the springs 19 force the complemental slide nut block 17 toward the fixed nut block 8. When the locking lever 23 is forced or moved down into the space between fixed block 8 and the end bar 22 this positively holds the two split half nut sections 8 and 17 together as seen in FIGS. 2 and 7.

When the locking lever or bar 23 is raised to inoperative position as seen in FIGS. 1, 3 and 6, a manual squeeze pressure on the opposite side faces 5 and 22 of the nut structure, for instance by the thumb and forefinger as seen in FIG. 3, will actuate and support the nut structure 1 in open position so that it can be easily and conveniently placed on a suitable conventionally threaded member such as a bolt or threaded shaft or rod, even with gloves on the operator's hands.

Release of the squeeze pressure permits the springs 19 to close the split nut sections 8 and 17 together into threaded engagement with the threads on the inserted bolt, shaft, or rod. By swinging the locking lever 23 down into operative position as seen in FIG. 7 the nut structure is then securely locked and can be rotated and torqued up tight, for instance by a wrench, in the same manner as a conventional nut. The split half nut structure can thus be opened, easily held, and manipulated or applied to a conventional bolt or stud in the dark and in fairly inaccessible places, under practically any conditions and environments, and when released will stay in proper threaded position, and may even be turned or torqued up reasonably tight without the use of the locking means or lever 23, depending of course on the strength of the compression coil springs 19.

Referring to FIGS. 10 to 13, a modification is shown in which the locking means comprise a locking slide bar 30 which is slidably mounted in suitable guide means 31 and 32.

Figure 10:
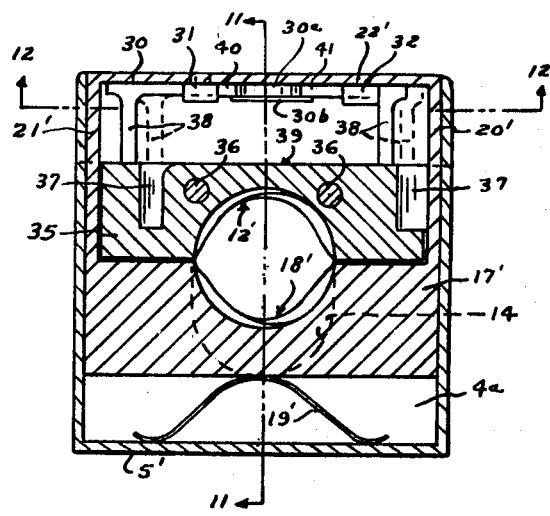
FIGURE 10 is a horizontal sectional view through a modified split nut structure showing a different type of locking means which is operable to lock the split nut sections together against separation.

The stationary or fixed complemental half nut section or block 35 which is held in place in the casing by the rivets 36 is formed with cut out portions 37 while the locking bar 30 is provided with laterally extending abutment fingers 38 which normally engage the outer surface 39 of the fixed block 35 when the locking bar 30 is in locking position as shown in full lines in FIG. 10.

By moving the locking bar 30 to the right as shown in dotted lines the abutment fingers 38 are disposed to enter the cutaway portions 37 and upon the application of squeeze pressure to the opposite sides of the nut structure, namely the bar 22' and side 5' (similar to 22 and 5 in FIG. 3) the half nut portions or blocks 35 and 17' can be separated to open or separate the semicircular threaded openings 12' and 18' in the respective half nut sections or blocks 35 and 17'. This action, of course, further tensions the spring means 19', which in this case comprises a leaf spring, although conical springs may be used.

Upon release of the ssueeze pressure aforesaid the spring 19' returns the threaded slide block 17 into threaded engagement with the threads of conventional bolt or other threaded rod or shaft when inserted between the blocks. The locking bar 30 may then be shifted into locking position as shown in full lines in FIGS. 10 and 12 locking the blocks 35 and 17 together.

The locking bar 30 is slidably retained against the end bar 22' by overhanging guide fingers 31 and 32 projecting inwardly from this end plate 30 and around the opposite edges of the slide bar, substantially as shown.

Figure 11:
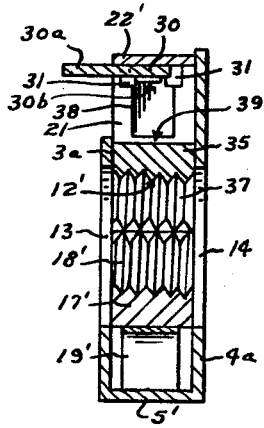
FIGURE 11 is a sectional view taken about on line 11—11 in FIG. 10.
Figure 12:
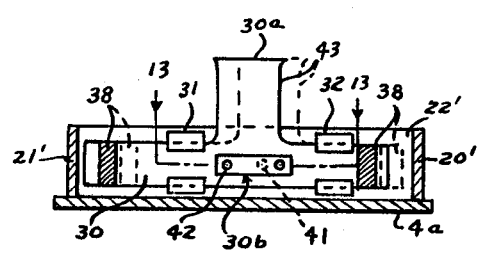
FIGURE 12 is a sectional view taken about on line 12—12 of FIG. 10, showing the locking means and detent holding means for selectively holding the slidable half nut block or section in locked position against the fixed half nut section, or unlocked to permit separation of the two half nut sections.

The means for shifting the locking bar or plate 30 between its locking and unlocked positions comprises a laterally extending projection or tab 30a which projects outwardly beyond the face or side 3a of the nut structure as seen in FIGS. 11 and 12 where it can be easily and conveniently shifted by the operator. This leaves all four side edges of the nut structure free and smooth for the reception of a wrench or other suitable torqueing tool (not shown).

Figure 13:
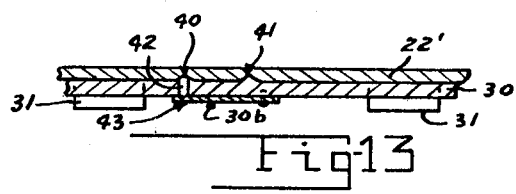
FIGURE 13 is a fragmentary sectional view about on line 13—13 in FIG. 12, showing the locking slide holding detent means.

An suitable detent means 30b may be provided for releasably retaining the locking bar 30 in either of its two positions. For instance, the inner face of the side bar 22' may be provided with spaced detent sockets 40 and 41 while the locking bar 30 is provided with an opening in which a ball or pin detent 42 is mounted and a leaf spring 43 is fixed on the locking bar 30 to yieldably urge the ball or pin 42 into retaining position in either one of the detent recesses 40 or 41 when the bar 30 is shifted by the tab 30a as seen in FIG. 13. Of course, a resilient detent tongue could be stamped out of the locking bar instead if necessary.

When the locking bar 30 is shifted to the left by pressure on the lateral arm 30a the abutment fingers 38 are disposed to engage the surface 39 of the half nut block 35 and prevent release of a threaded shaft by the separation of the split nut portions 35 and 17'. Movement of the locking bar 30 to the right by pressure on the arm 30a moves the locking means to inoperative position.

No difficulty in the assembly of the device is experienced.

The springs 19 (or 19') and the half nut slide block portion 17 (or 17') is slid into the casing between the top and bottom plates 3 and 4 (or 3a and 4a) of the casing. The other fixed slide block portion 8 (or 35) is then disposed between the arms 20, 21 (or 20', 21') and the rivets 11 (or 36) inserted in previously prepared rivet holes in the block 8 (or 35) and in the top and bottom plates 3 and 4 (or 3a and 4a) and riveted over. This provides a self-contained simple and inexpensive split or separable nut like fastener, which may be quickly and conveniently applied to any suitable conventional cylindrical threaded member such as a bolt, rod or shaft. The pitch, thread shape and diameter must, of course, conform to the semicircular threaded openings 12 and 18 (FIGS. 4 and 5) in the blocks 8 and 17.

For purposes of exemplification a particular embodiment and modification of the invention has been shown and described to the best understanding thereof. However, it will be apparent that changes and modifications in the arrangement and construction of the parts thereof may be resorted to without departing from the true spirit and scope of the invention as defined in the following claims.

I claim:

1. A quick action separable nut like fastener device for use with suitable size conventional threaded bolts and the like comprising a substantially rectangular rigid casing having parallel top and bottom closure plates and side edge walls extending around three sides of the device to leave the fourth side open, an elongated half nut section fixed in said casing between said top and bottom plates with the opposite ends of said section spaced from the opposite side edge walls at the opposite ends of the fourth open side to provide a guide passage between each of said opposite ends of the fixed nut section and the last mentioned opposite side edge walls and spaced from the intermediate side edge wall, said half nut section having a substantially semicircular bolt receiving threaded recess formed therein facing said intermediate side edge wall, an elongated slidable half nut section slidably disposed within said casing between said fixed half nut section and the intermediate side edge wall and said top and bottom plates, said slidable half nut section having a substantially semicircular bolt receiving threaded recess therein complemental to and facing the aforementioned threaded recess in the fixed nut section, rigid actuating arm means connected to each of the opposite ends of said slidable half nut section and extending out of said casing past said fixed half nut section through said guide passages, a slide block actuating bar connecting the free ends of said actuating arm means together exteriorly of said casing, spring means within said casing between said slidable half nut section and said intermediate side edge wall yieldably urging said slidable half nut section toward said fixed half nut section to urge the half nut sections together, said top and bottom plates of said casing having substantially aligned elongated bolt receiving openings therethrough suitably sized for the free insertion of a suitable conventional threaded bolt or the like therethrough between the complemental semicircular threaded recesses in the fixed and slidable half nut sections when the slidable half nut section is moved away from the fixed half nut section by actuating pressure on said actuating bar, by squeeze pressure applied between said bar and said intermediate side edge wall of said casing.

2. A quick action separable split nut fastener device as set forth in claim 1, including locking means movable on said actuating bar to a locking position in between said fixed half nut section and said actuatng bar for blocking movement of said actuating bar and said connected slidable half nut section when said slidable half nut section is moved by said spring means into contacting engagement with said fixed nut section and movable on said actuating bar to a release position out of the way of said fixed half nut section to permit separation of said slidable half nut section from said fixed half nut section to permit the insertion or removal of a conventional suitable bolt or the like member into or from the semicircular threaded recesses in the half nut sections.

3. A quick action separable split nut fastener device as claimed in claim 2 in which the locking means comprises a locking lever pivoted at one end on said actuating bar and swingable into said locking position into the space between the actuating bar and the fixed half nut section when the slidable half nut section is moved toward said fixed half nut section by said spring means to block the squeeze movement on said actuating bar from moving said slidable half nut away from said fixed half nut section.

4. A quick action separable split nut fastener device as claimed in claim 2 including holding detent means on said locking means for yieldably retaining said locking means in either of its locking or release positions.

5. A separable nut-like fastener device for use with conventional threaded bolts and the like comprising:
  (a) a rigid, hollow casing having peripheral side walls capable of accepting a wrenching tool, an opening in the peripheral side walls and aligned openings normal to the side wall opening for accepting a male threaded member;
  (b) a fixed half-nut section secured in the casing having a semicircular threaded recess spaced apart from the peripheral side walls, the sides of the fixed half-nut section being spaced from the peripheral side walls to define guide passages;
  (c) a slidable half-nut section slidably disposed within the casing between the fixed half-nut section and the peripheral side walls having a semicircular threaded recess complementing and facing the threaded recess of the fixed half-nut section;
  (d) spring means operable to urge the slidable half-nut section against the fixed half-nut section;
  (e) a pair of actuating arms attached to the slidable half-nut section and disposed in the guide passages, the actuating arms normally extending past the fixed half-nut section towards the opening in the peripheral side walls;
  (f) an actuating bar attached to the actuating arms outside the fixed half-nut section with a space between the actuating bar and the fixed half-nut section; and
  (g) releasable locking means operable in a locking position to act within the space between the actuating bar and the fixed half-nut section to block movement of the actuating bar towards the fixed half-nut section, and operable in a released position to free the space between the actuating bar and the fixed half-nut section to permit separation of the slidable half-nut section from the fixed half-nut section by squeeze pressure applied against the spring means through the actuating bar and the peripheral side walls.

6. The separable nut-like fastener claimed in claim 5 wherein the locking means includes:
   a locking lever pivotally connected to the fastener such that the locking lever:
   (i) occupies the space between the actuating bar and the fixed half-nut section in the locking position, and
   (ii) frees the space between the actuating bar and the fixed half-nut section in the released position.

7. The separable nut-like fastener claimed in claim 5 wherein the locking means includes:
   (a) a locking bar slidably disposed in the space between the actuating bar and the fixed half-nut section;
   (b) at least one abutment finger on the locking bar extending from the locking bar for abutment against the fixed half-nut section when the locking bar is in its locking postion; and
   (c) a slot for each of the abutment fingers disposed in the fixed half-nut section to receive the abutment fingers when the locking bar is slid from the locking position to the released position and squeeze pressure is applied against the spring means through the actuating bar and the peripheral side walls.

References Cited

UNITED STATES PATENTS

| | | | |
|---|---|---|---|
| 1,001,042 | 8/1911 | Kadel | 85—33 |
| 1,271,650 | 7/1918 | Arkin | 85—33 |
| 2,700,995 | 2/1955 | Ritter | 85—33 |
| 2,705,983 | 4/1955 | Guadagna | 85—33 |
| 3,147,662 | 9/1964 | Snook | 85—33 |

FOREIGN PATENTS

| | | |
|---|---|---|
| 40,106 | 7/1965 | Germany. |
| 1,070,112 | 2/1954 | France. |
| 1,114,306 | 12/1955 | France. |

MARION PARSONS, JR., *Primary Examiner.*